(12) United States Patent
Yoshimura

(10) Patent No.: US 11,195,296 B2
(45) Date of Patent: Dec. 7, 2021

(54) INFORMATION PROCESSING APPARATUS, METHOD OF PROCESSING DISTANCE INFORMATION, AND RECORDING MEDIUM RECORDING DISTANCE INFORMATION PROCESSING PROGRAM

(71) Applicant: FUJITSU LIMITED, Kawasaki (JP)

(72) Inventor: Kazuhiro Yoshimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 8 days.

(21) Appl. No.: 16/575,328

(22) Filed: Sep. 18, 2019

(65) Prior Publication Data

US 2020/0013185 A1    Jan. 9, 2020

Related U.S. Application Data

(63) Continuation of application No. PCT/JP2017/013920, filed on Apr. 3, 2017.

(51) Int. Cl.
*G06T 7/73* (2017.01)
*G06T 7/521* (2017.01)
*G06T 7/13* (2017.01)

(52) U.S. Cl.
CPC ............. *G06T 7/73* (2017.01); *G06T 7/13* (2017.01); *G06T 7/521* (2017.01); *G06T 2207/10028* (2013.01)

(58) Field of Classification Search
CPC .. G06T 7/73; G06T 7/521; G06T 7/13; G06T 2207/10028
See application file for complete search history.

(56) References Cited

U.S. PATENT DOCUMENTS

| 9,053,547 | B2* | 6/2015 | Kitamura | G01B 11/24 |
| 9,251,399 | B2* | 2/2016 | Hwang | G06T 7/11 |
| 9,858,670 | B2* | 1/2018 | Nakazato | G06T 7/50 |
| 9,977,983 | B2* | 5/2018 | Kochi | G06T 17/00 |

(Continued)

FOREIGN PATENT DOCUMENTS

| JP | 2004-012221 A | 1/2004 |
| JP | 2009-204615 A | 9/2009 |

(Continued)

OTHER PUBLICATIONS

International Search Report and Written Opinion of the International Searching Authority (Form PCT/ISA/210, 220, and 237), mailed in connection with PCT/JP2017/013920 and dated Jun. 27, 2017 (10 pages).

(Continued)

*Primary Examiner* — Gregory M Desire
(74) *Attorney, Agent, or Firm* — Fujitsu Patent Center

(57) ABSTRACT

An information processing apparatus, includes: a memory; and a processor coupled to the memory and configured to: generate, based on three-dimensional point cloud data indicating three-dimensional coordinates of each point on a three-dimensional object, image data in which two-dimensional coordinates of each point and a depth of each point are associated with each other; specify, as a target point, a point of the three-dimensional point cloud data corresponding to an edge pixel included in an edge portion of the image data, and specifies, as a neighbor point, a point of the three-dimensional point cloud data corresponding to a neighbor pixel of the edge pixel; and eliminate the target point based on a number of the neighbor points at which a distance to the target point is less than a predetermined distance.

9 Claims, 18 Drawing Sheets

(56) References Cited

U.S. PATENT DOCUMENTS

| | | | |
|---|---|---|---|
| 10,237,532 B2* | 3/2019 | Monnier | G06T 19/20 |
| 10,262,222 B2* | 4/2019 | Shteinfeld | G06T 7/62 |
| 2010/0034426 A1 | 2/2010 | Takiguchi et al. | |
| 2013/0106849 A1* | 5/2013 | Ha | G06K 9/6284 |
| | | | 345/420 |
| 2015/0206023 A1 | 7/2015 | Kochi et al. | |
| 2015/0254499 A1* | 9/2015 | Pang | G06T 7/001 |
| | | | 382/103 |
| 2016/0373717 A1* | 12/2016 | Wang | G06T 7/90 |
| 2018/0101932 A1* | 4/2018 | Kwon | G06T 3/0068 |
| 2020/0013185 A1* | 1/2020 | Yoshimura | G01B 11/00 |

FOREIGN PATENT DOCUMENTS

| | | |
|---|---|---|
| JP | 2009-229182 A | 10/2009 |
| JP | 2012-038105 A | 2/2012 |
| JP | 2012-120647 A | 6/2012 |

OTHER PUBLICATIONS

Tomasz Dziubich et al., "Depth Images Filtering in Distributed Streaming", Polish Maritime Research 2, vol. 23, No. 2, Apr. 1, 2016, pp. 91-98, XP055658154.

Katja Wolff et al., "Point Cloud Noise and Outlier Removal for Image-Based 3D Reconstruction", 2016 Fourth International Conference on 3D Vision (3DV), IEEE, Oct. 25, 2016, pp. 118-127, XP033027617.

EESR—Extended European Search Report of European Patent Application No. 17904804.6 dated Jan. 31, 2020.

CNOA—Office Action of Chinese Patent Application No. 201780089265.5 dated Mar. 1, 2021 with English Translation.

CNOA—Office Action of Chinese Patent Application No. 201780089265.5 dated Jun. 24, 2021 with English Translation.

* cited by examiner

FIG. 4

| IDENTIFICATION NUMBER | X-COORDINATE | Y-COORDINATE | Z-COORDINATE 110a |
|---|---|---|---|
| 1001 | -6.08571 | -4.5619 | 10 |
| 1002 | -6.06667 | -4.5619 | 10 |
| 1003 | -6.04762 | -4.5619 | 10 |
| 1004 | -6.02857 | -4.5619 | 10 |
| 1005 | -6.00952 | -4.5619 | 10 |
| 1006 | -5.99048 | -4.5619 | 10 |
| ... | ... | ... | ... |

| TYPE | VALUE |
|---|---|
| width | ○○ |
| height | ○○ |
| θ x | ○○ [rad] |
| θ y | ○○ [rad] |
| depth_resolusion | ○○ |
| r | 0.040(m) |

INFORMATION PROCESSING APPARATUS, METHOD OF PROCESSING DISTANCE INFORMATION, AND RECORDING MEDIUM RECORDING DISTANCE INFORMATION PROCESSING PROGRAM

CROSS-REFERENCE TO RELATED APPLICATION

This application is a continuation application of International Application PCT/JP2017/013920 filed on Apr. 3, 2017 and designated the U.S., the entire contents of which are incorporated herein by reference.

FIELD

The embodiment relates to an Information processing apparatus and the like.

BACKGROUND

A shape of a three-dimensional object is measured using a distance sensor. [0006] Related art is disclosed in Japanese Laid-open Patent Publication No. 2009-204615 and Japanese Laid-open Patent Publication No. 2009-229182.

SUMMARY

According to an aspect of the embodiments, an information processing apparatus, includes: a memory; and a processor coupled to the memory and configured to: generate, based on three-dimensional point cloud data indicating three-dimensional coordinates of each point on a three-dimensional object, image data in which two-dimensional coordinates of each point and a depth of each point are associated with each other; specify, as a target point, a point of the three-dimensional point cloud data corresponding to an edge pixel included in an edge portion of the image data, and specifies, as a neighbor point, a point of the three-dimensional point cloud data corresponding to a neighbor pixel of the edge pixel; and eliminate the target point based on a number of the neighbor points at which a distance to the target point is less than a predetermined distance.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a table illustrating an exemplary data structure of three-dimensional point cloud data.

FIG. 6 is a table illustrating an exemplary data structure of parameters.

DESCRIPTION OF EMBODIMENTS

Figure 15:
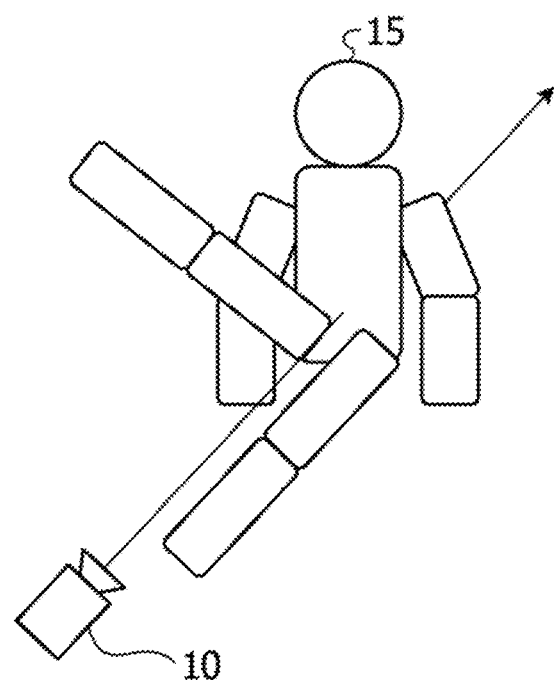
FIG. 15 is a diagram (1) for illustrating edge noise.
Figure 16:
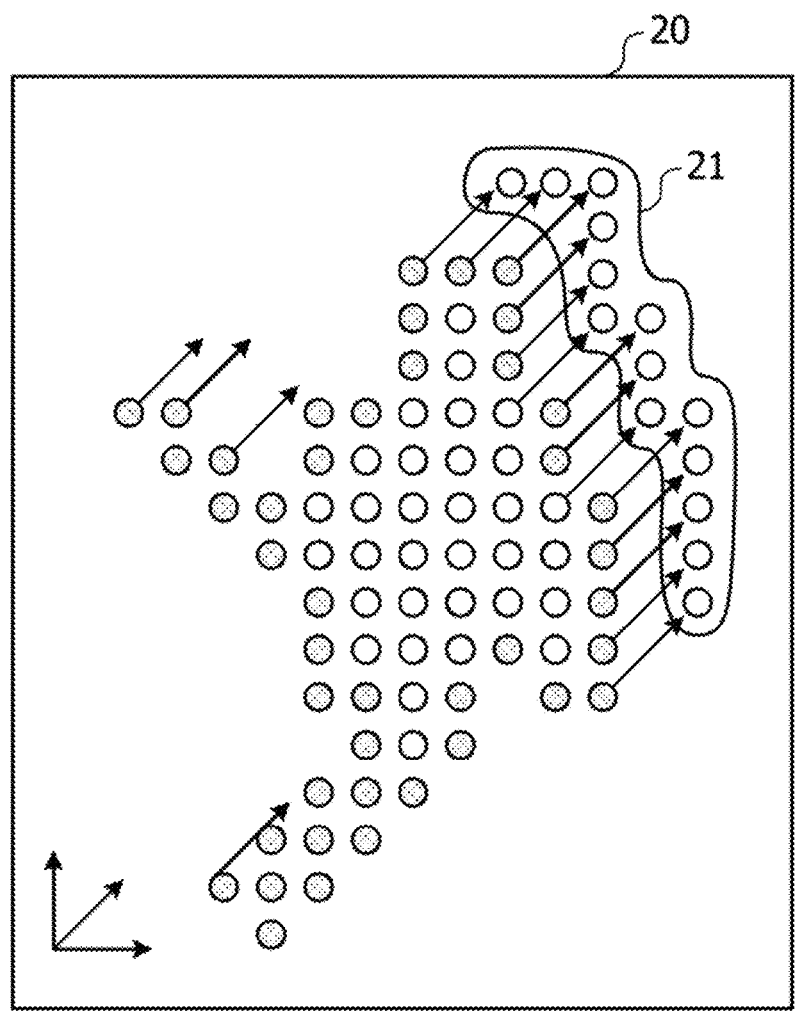
FIG. 16 is a diagram (2) for illustrating edge noise.

For example, when a shape of a three-dimensional object is measured using a distance sensor, edge noise may occur in the depth direction in the edge portion of the three-dimensional object relative to the actual position. FIGS. 15 and 16 are diagrams for illustrating the edge noise. As illustrated in FIG. 15, when a three-dimensional object 15 is measured using a distance sensor 10, three-dimensional point cloud data 20 illustrated in FIG. 16 is obtained. In the example illustrated in FIG. 16, each point 21 in the three-dimensional point cloud data is edge noise.

Figure 17:
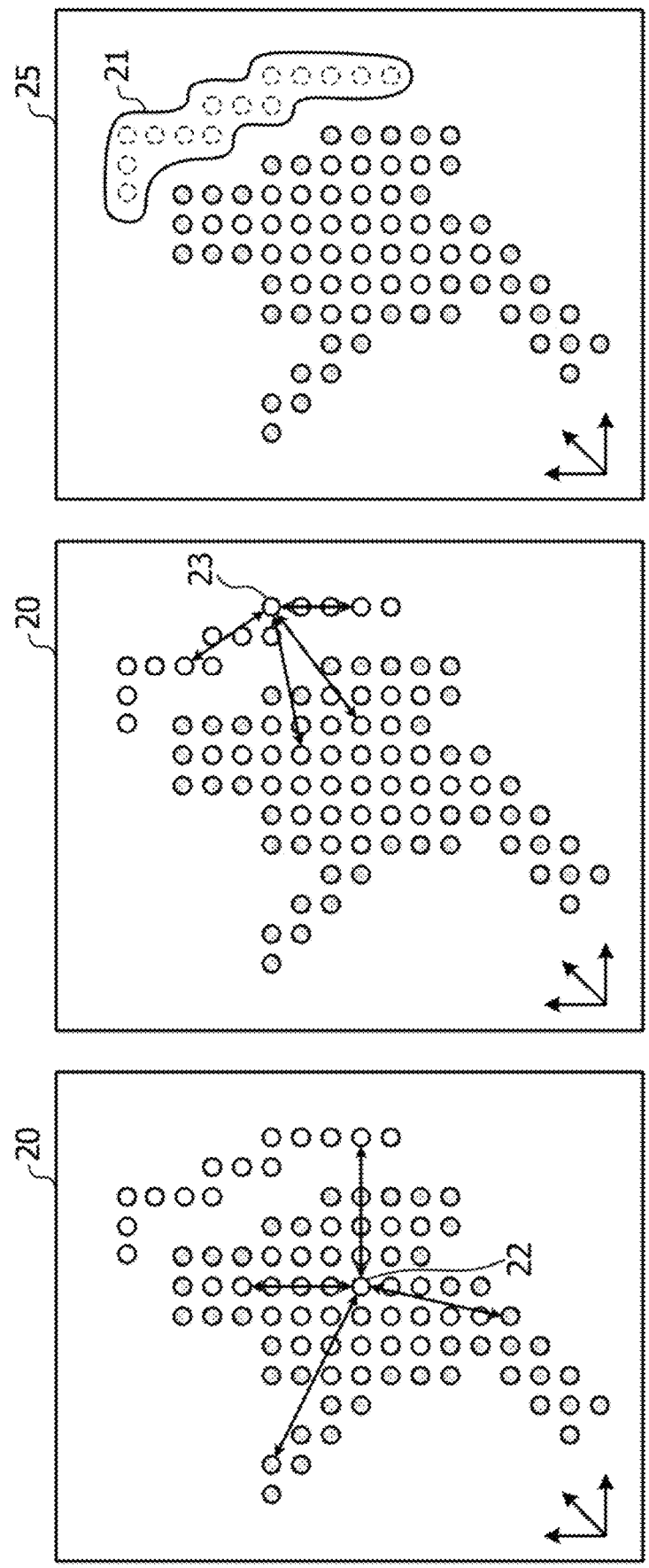
FIG. 17 is a diagram for Illustrating exemplary three-dimensional point cloud data.

FIG. 17 is a diagram for illustrating an example of three-dimensional point cloud data. For example, point group density is calculated for each point included in the three-dimensional point cloud data 20 by obtaining a distance to another point. For example, points with the point group density higher than a threshold value are left, and points with the point group density lower than the threshold value are eliminated. The point group density is the number of points included in a sphere of a radius r centered on a target point.

For example, since there are many points included in the sphere of the radius r centered on a point 22, it can be said that the point 22 is high in the point group density. Therefore, the point 22 is left. On the other hand, since there are few points included in the sphere of the radius r centered on a point 23, it can be said that the point 23 is low in the point group density. Therefore, the point 23 is eliminated. For example, the process described above is repeated for each point included in the three-dimensional point cloud data 20, thereby eliminating each point 21 to be the edge noise and generating three-dimensional point cloud data 25 without the edge noise.

Figure 18:
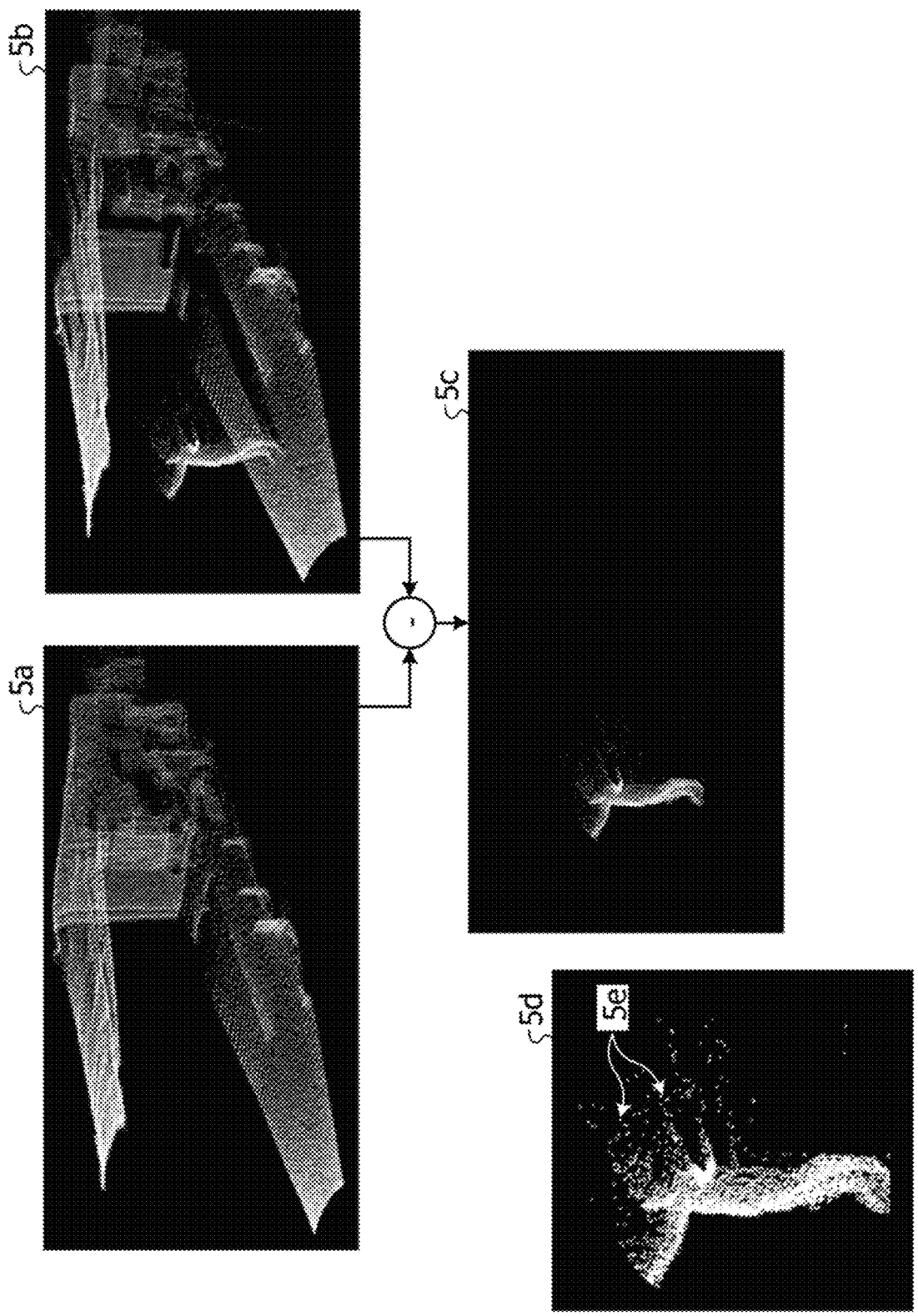
FIG. 18 is a view illustrating exemplary background difference processing.

Note that, in a case where three-dimensional point cloud data of a three-dimensional object is calculated, background difference processing is executed. FIG. 18 is a view illustrating an example of the background difference processing. As illustrated in FIG. 18, the difference between background three-dimensional point cloud data Sa and three-dimensional point cloud data 5b of the background+the three-dimensional object is taken, thereby obtaining three-dimensional point cloud data Sc of only the three-dimensional object. The vicinity of the three-dimensional object of the three-dimensional point cloud data Sc is enlarged to obtain enlarged data 5d. The enlarged data 5d includes edge noise Se.

However, there may be a problem that an amount of calculation in the case of eliminating the noise from the three-dimensional point cloud data is large.

For example, distances between the target point and other points are calculated, and then the number of points included in the sphere of the radius r centered on the target point is counted, thereby calculating the point group density. Accordingly, when the number of points increases, the amount of calculation increases. For example, assuming that the number of points of three-dimensional point number data is N, the amount of calculation is "$O(N^2)$".

In one aspect, a distance information processing apparatus, a method of processing distance information, and a distance Information processing program which are capable of suppressing an amount of calculation in the case of eliminating noise from three-dimensional point cloud data may be provided.

An embodiment of a distance information processing apparatus, a method of processing distance information, and a distance information processing program according to the present invention will be described in detail below with reference to the drawings. Note that the present invention is not limited by the embodiment.

Embodiment

Figure 1:
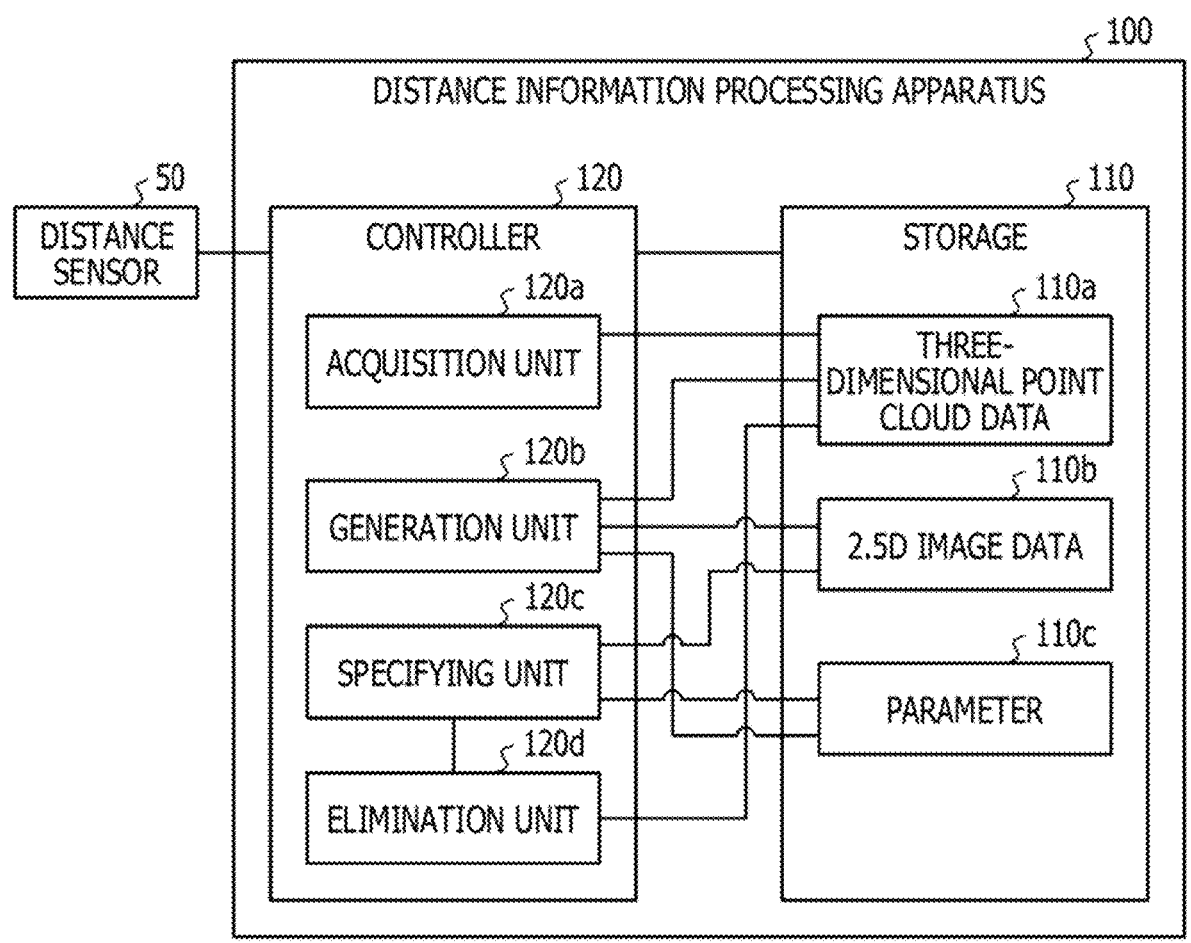
FIG. 1 is a functional block diagram illustrating a configuration of a distance information processing apparatus according to the present embodiment.

FIG. 1 is a functional block diagram illustrating a configuration of a distance information processing apparatus according to the present embodiment. As illustrated in FIG. 1, a distance information processing apparatus 100 is coupled to a distance sensor 50. The distance sensor 50 outputs, to the distance information processing apparatus 100, three-dimensional point cloud data indicating three-dimensional coordinates of each point on a three-dimensional object.

Figure 2:
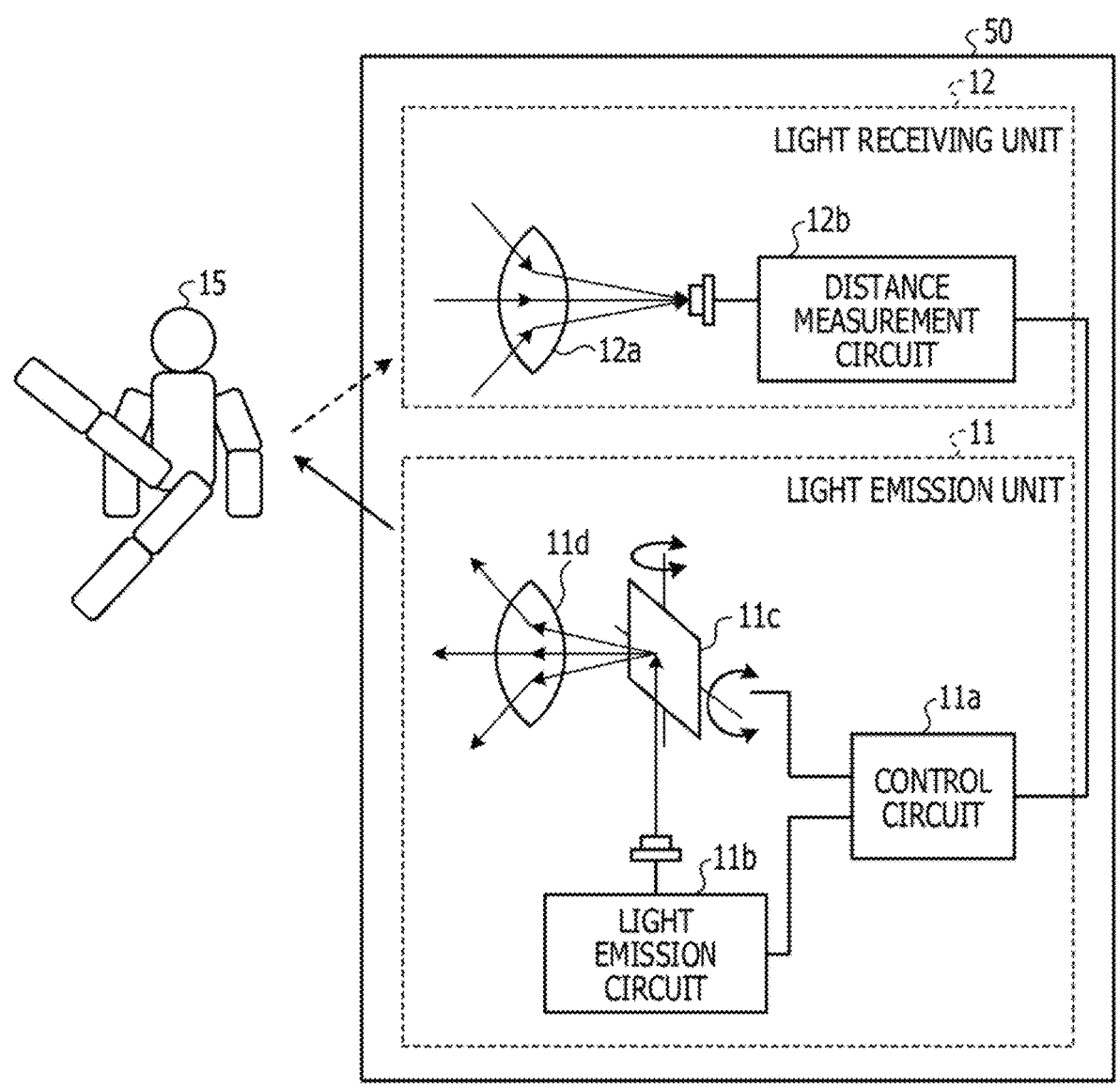
FIG. 2 is a diagram illustrating an exemplary distance sensor.

FIG. 2 is a diagram illustrating an example of the distance sensor. The distance sensor 50 includes a light emission unit 11, and a light receiving unit 12. The light emission unit 11 is a device that emits a laser to a three-dimensional object 15. The light receiving unit 12 is a device that receives the laser reflected from the three-dimensional object 15.

The light emission unit 11 includes a control circuit 11a, a light emission circuit 11b, a mirror 11c, and a lens 11d. The control circuit 11a is a device that controls the destination of the laser emission by controlling the orientation of the mirror 11c. Further, the control circuit 11a provides the light emission circuit 11b with an instruction on a light emission timing, and notifies a distance measurement circuit 12b of the light emission timing. The light emission circuit 11b is a device that emits a laser at the light emission timing instructed by the control circuit 11a. The laser emitted from the light emission circuit 11 reaches the three-dimensional object 15 via the mirror 11c and the lens 11d.

The light receiving unit 12 includes a lens 12a, and the distance measurement circuit 12b. The laser reflected from the three-dimensional object 15 reaches the distance measurement circuit 12b via the lens 12a. The distance measurement circuit 12b is a device that measures the distance between a point on the three-dimensional object 15 reached by the laser and the distance sensor 50 from the time from the emission timing of the laser to the reception timing of the laser. In addition, the distance measurement circuit 12b determines three-dimensional coordinates of the point on the three-dimensional object 15 on the basis of the three-dimensional position of the distance sensor 50 and the distance between the point on the three-dimensional object 15 reached by the laser and the distance sensor 50.

The distance sensor 50 changes the irradiation position of the laser, and repeatedly executes the process described above, thereby generating the three-dimensional point cloud data indicating three-dimensional coordinates of each point on the three-dimensional object 15. Note that the distance sensor 50 according to the present embodiment generates the three-dimensional point cloud data by executing a raster scan.

Figure 3:
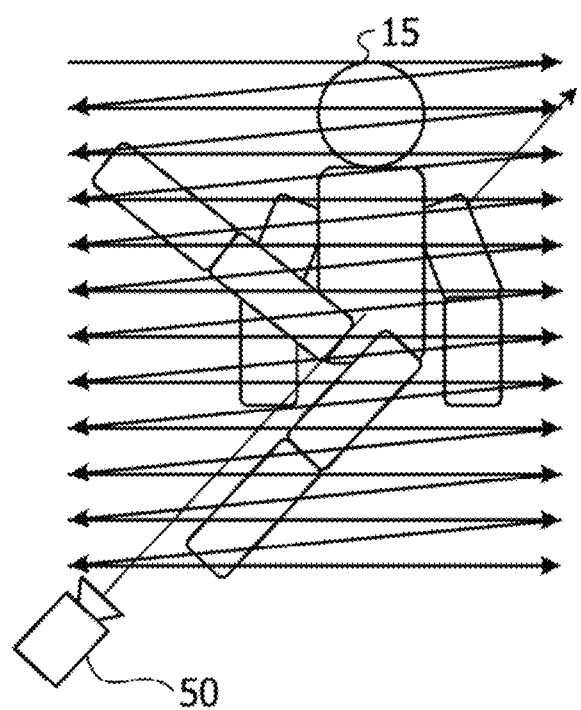
FIG. 3 is a diagram for illustrating exemplary raster scan.

FIG. 3 is a diagram for illustrating an example of the raster scan. According to the raster scan, scanning is performed from the left end to the right end in the space where the three-dimensional object 15 exists (laser irradiation position is moved), and when it reaches the right end, it shifts to one lower line, and repeatedly executes the processing mentioned above. By the raster scan being executed, the three-dimensional coordinates of each point included in the three-dimensional point cloud data are arranged in the order of scanning based on the raster scan.

The distance sensor 50 executes the background difference processing described with reference to FIG. 18, thereby generating the three-dimensional point cloud data of the three-dimensional object.

The description returns to the description of FIG. 1. The distance information processing apparatus 100 includes a storage 110, and a controller 120. The storage 110 includes three-dimensional point cloud data 110a, 2.5D image data 110b, and a parameter 110c. The storage 110 corresponds to a semiconductor memory element such as a random access memory (RAM), a read only memory (ROM), and a flash memory, or a storage device such as a hard disk drive (HDD).

The three-dimensional point cloud data 110a is data Indicating three-dimensional coordinates of each point on the three-dimensional object. FIG. 4 is a table illustrating an exemplary data structure of the three-dimensional point cloud data. As illustrated in FIG. 4, the three-dimensional point cloud data 110a associates an identification number, an x-coordinate, a y-coordinate, and a z-coordinate with each other. The identification number is data uniquely identifying a point of the three-dimensional object 15 in the three-dimensional space. The x-coordinate, the y-coordinate, and the z-coordinate indicate three-dimensional coordinates of the point corresponding to the identification number. The three-dimensional point cloud data 110a is arranged in the order of the raster scan from the top, for example.

Figure 5:
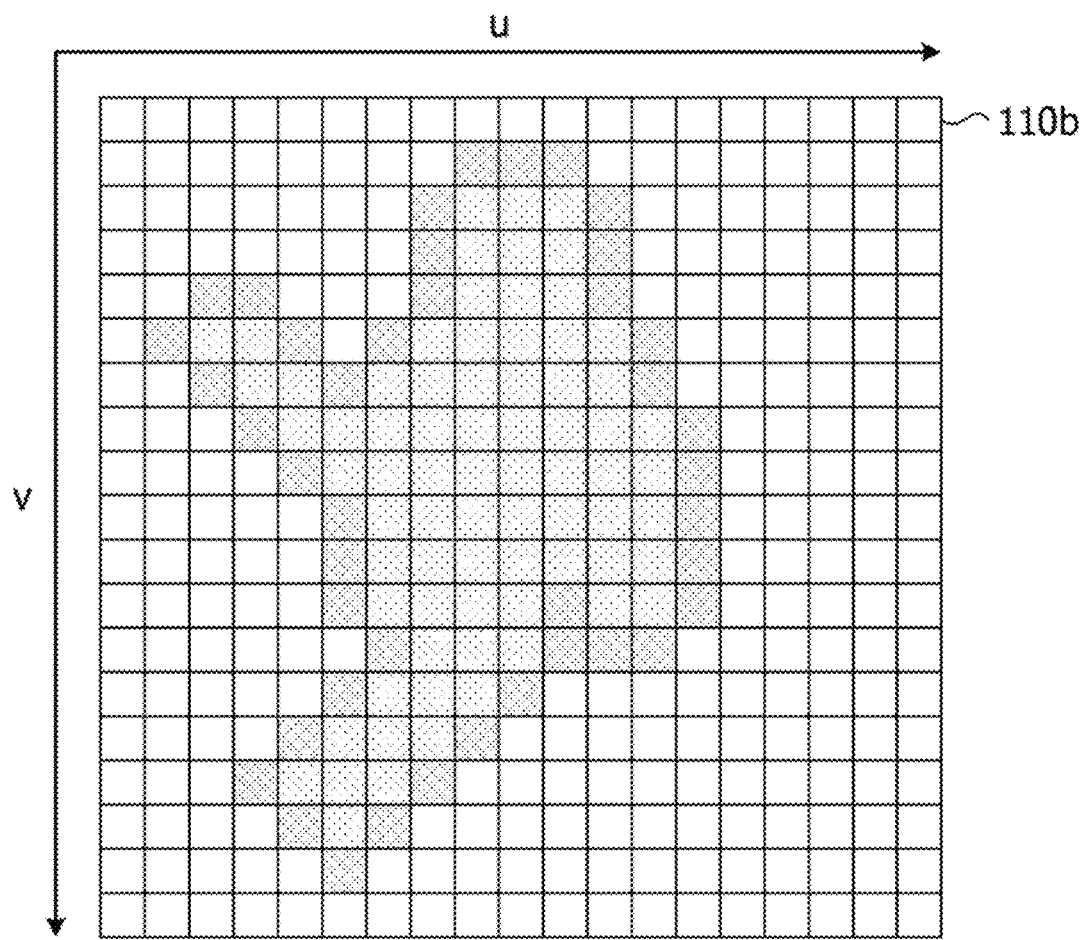
FIG. 5 is a diagram Illustrating an exemplary data structure of 2.5D image data.

The 2.5D image data 110b is data in which the two-dimensional coordinates calculated from the three-dimensional coordinates of each point of the three-dimensional object 15 are associated with the depth. FIG. 5 is a diagram illustrating an exemplary data structure of the 2.5D image data. In the 2.5D image data 110b, the depth is associated with a pixel indicated by a u-axis and a v-axis. Further, each pixel of the 2.5D image data may be associated with the identification number of the three-dimensional point cloud data 110a, for example.

Figure 7:
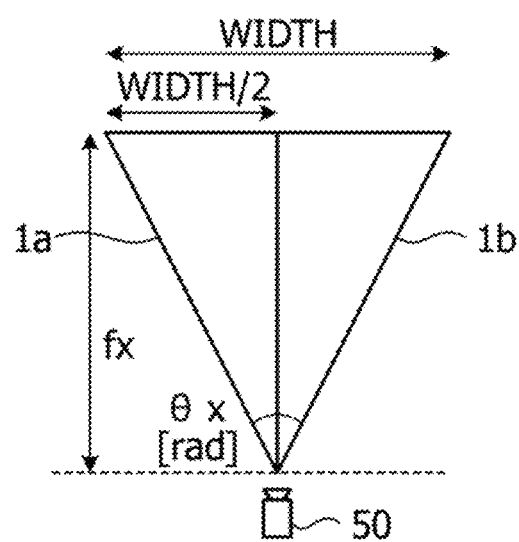
FIG. 7 is a diagram (1) for giving a supplemental explanation of the parameters.
Figure 8:
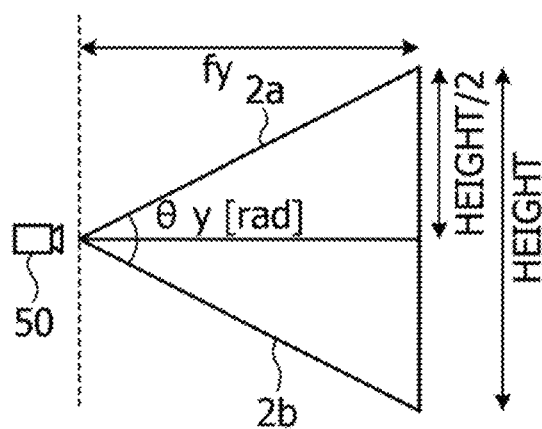
FIG. 8 is a diagram (2) for giving a supplemental explanation of the parameters.

The parameter 110c is a parameter used to generate the 2.5D image data 110b. FIG. 6 is a table illustrating an exemplary data structure of the parameters. FIGS. 7 and 8 are diagrams for giving a supplemental explanation of the parameters.

As illustrated in FIG. 6, in the parameter 110c, a value and a type of the parameter are associated with each other. The parameter includes width, height, θx, θy, depth_resolution, and r. Among of them, width and Ox will be described with reference to FIG. 7. FIG. 7 illustrates the distance sensor 50 viewed from the above. The "width" represents a range in the x-axis direction in which the distance sensor 50 performs the raster scan, which corresponds to the number of acquisition points in the x-axis direction. The "Ox" is an angle between a line segment 1a and a line segment 1b. The line segment 1a is a line segment passing through the distance sensor 50 and the left end of the range in the x-axis direction in which the raster scan is performed. The line segment 1b is a line segment passing through the distance sensor 50 and the right end of the range in the x-axis direction in which the raster scan is performed.

The height and θy will be described with reference to FIG. 8. FIG. 8 illustrates the distance sensor 50 viewed from the side. The "height" represents a range in the y-axis direction in which the distance sensor 50 performs the raster scan, which corresponds to the number of acquisition points in the y-axis direction. The "θy" is an angle between a line segment 2a and a line segment 2b. The line segment 2a is a line segment passing through the distance sensor 50 and the upper end of the range in the y-axis direction in which the raster scan is performed. The line segment 2b is a line segment passing through the distance sensor 50 and the lower end of the range in the y-axis direction in which the raster scan is performed. Note that "depth_resolution" represents a resolution of the z-axis. In addition, "r" represents a range (radius) in the case of calculating point group density.

The controller 120 includes an acquisition unit 120a, a generation unit 120b, a specifying unit 120c, and an elimination unit 120d. The controller 120 can be implemented by a central processing unit (CPU), a micro-processing unit (MPU), or the like. In addition, the controller 120 may also be implemented by hard wired logic such as an application specific integrated circuit (ASIC), and a field programmable gate array (FPGA).

The acquisition unit 120a is a processing unit that obtains the three-dimensional point cloud data 110a from the distance sensor 50. The acquisition unit 120a registers the obtained three-dimensional point cloud data 110a in the storage 110.

The generation unit 120b is a processing unit that generates the 2.5D image data 110b on the basis of the three-dimensional point cloud data 110a and the parameter 110c. Hereinafter, an example of a process performed by the generation unit 120b will be described.

The generation unit 120b selects one point from among the three-dimensional point cloud data 110a, and calculates the u-axis value, v-axis value, and depth on the 2.5D image data 110b corresponding to the selected point on the basis of formulae (1) to (3). The generation unit 120b maps the depth to the position corresponding to the u-axis value and the v-axis value on the 2.5D image data 110b corresponding to the selected point on the basis of a result of the calculation. At the time of performing the mapping to the pixel of the 2.5D image data 110b, the generation unit 120b associates the identification number of the selected point. The generation unit 120b repeatedly performs the process described above on all points included in the three-dimensional point cloud data 110a, thereby generating the 2.5D image data 110b.

$$u = pc[idx].x * fx / pc[idx].z + cx + 1 \quad (1)$$

$$v = pc[idx].y * fy / pc[idx].z + cy + 1 \quad (2)$$

$$depth[u][v] = pc[idx].z / depth\_resolution \quad (3)$$

The formula (1) is for calculating the u-axis value. The formula (2) is for calculating the v-axis value. Depth[u][v] is for calculating the depth corresponding to the u-axis value and the v-axis value. In the formulae (1) to (3), pc[idx].x, pc[idx].y, and pc[idx].z represent the idx-th three-dimensional coordinates (x-coordinate value, y-coordinate value, z-coordinate value) of the idx-th point selected from the three-dimensional point cloud data 110a.

In the formula (1), fx represents a focal length in the x-axis direction. The generation unit 120b calculates fx according to a formula (4). In the formula (2), fy represents a focal length in the y-axis direction. The generation unit 120b calculates fy according to a formula (5).

$$fx = width / (2 * \tan(\theta x / 2)) \quad (4)$$

$$fy = height / (2 * \tan(\theta y / 2)) \quad (5)$$

In the formula (1), cx represents an image center in the x-axis direction. The generation unit 120b calculates cx according to a formula (6). In the formula (2), cy represents an image center in the y-axis direction. The generation unit 120b calculates cy according to a formula (7).

$$cx = width / 2 \quad (6)$$

$$cy = height / 2 \quad (7)$$

The specifying unit 120c specifies, as an "target point", a point of the three-dimensional point cloud data 110a corresponding to the pixel of the edge portion on the basis of the 2.5D image data 110b. Further, the specifying unit 120c specifies, as a "neighbor point", a point of the three-dimensional point cloud data 110a corresponding to a neighbor pixel of the pixel of the edge portion.

Figure 9:
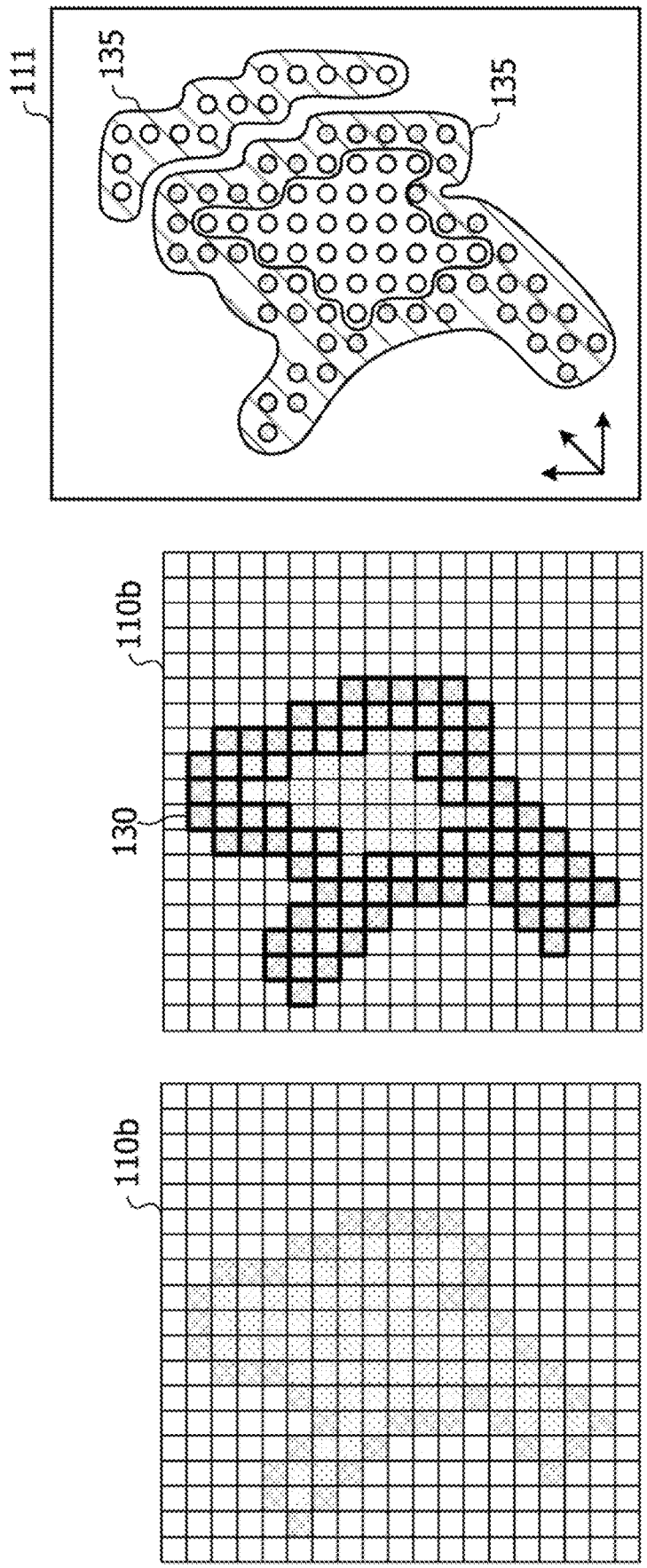
FIG. 9 is a diagram for illustrating a process of specifying a target point.

FIG. 9 is a diagram for illustrating the process of specifying the target point. As illustrated in FIG. 9, upon execution of edge extraction on the 2.5D image data 110b, an edge portion 130 is extracted from the 2.5D image data 110b. For example, the specifying unit 120c scans the 2.5D image data 110b, and specifies an area in which the value of the "depth" is not zero. The specifying unit 120c specifies, in the area in which the value of the "depth" is not zero, outer (edge) pixels and pixels adjacent to the outer pixels as the edge portion 130. Note that the extent to which the edge portion 130 is to be set can be adjusted as appropriate. For example, ±3 pixels on the right, left, top, and bottom of the edge may be set as the edge portion 130.

The specifying unit 120c specifies each point corresponding to each pixel included in the edge portion 130 from the three-dimensional point cloud data. Three-dimensional point cloud data 111 illustrated in FIG. 9 is an image that represents the three-dimensional point cloud data 110a. Each point corresponding to each pixel included in the edge portion 130 is each point 135. Each point 135 is to be a target point.

Figure 10:
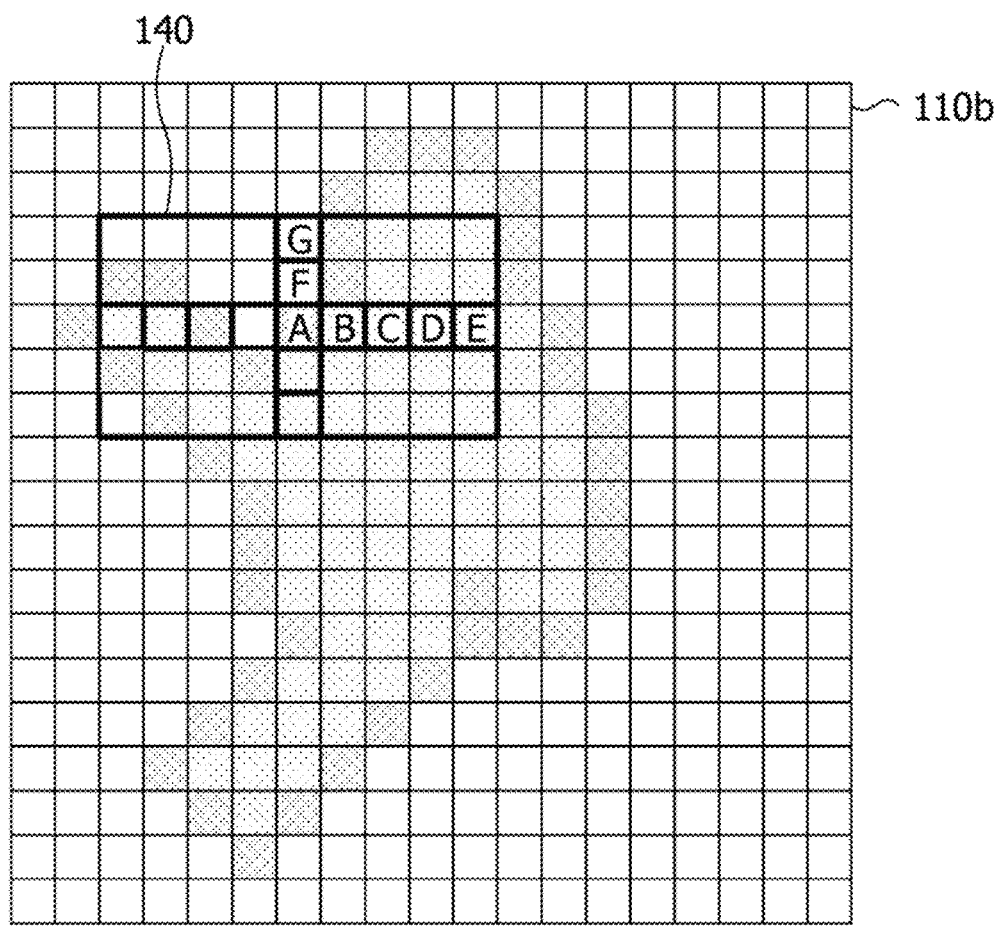
FIG. 10 is a diagram for illustrating a process of specifying a neighbor point.

FIG. 10 is a diagram for illustrating the process of specifying the neighbor point. The specifying unit 120c selects, as a target pixel, one pixel from among the pixels included in the edge portion. In the example illustrated in FIG. 10, the specifying unit 120 selects a target pixel A. The specifying unit 120 obtains, from the parameter 110c, a value of the radius r for calculating the point group density, and sets a rectangular range 140 that corresponds to a circle of the radius r with the target pixel A serving as a reference.

In order to specify the rectangular range 140, the specifying unit 120c obtains a distance ix of the x-axis per pixel (element), and a distance iy of the y-axis per pixel. For example, the specifying unit 120*c* calculates the distance ix according to a formula (8), and calculates the distance iy according to a formula (9).

$$ix=(pc[\text{width}*\text{height}-1].x-pc[0].x)/\text{width} \quad (8)$$

$$iy=(pc[\text{width}*\text{height}-1].y-pc[0].y)/\text{height} \quad (9)$$

Here, for the sake of convenience, the distance ix is set to be 0.010 m, and the distance iy is set to be 0.020 m. Furthermore, assuming that the radius for determining the point group density satisfies radius r=0.040 m, the rectangular range is two pixels on the upper and lower sides and four pixels on the right and left sides, which is the rectangular range 140 illustrated in FIG. 10. Note that, in FIG. 10, an x-coordinate of the point on the three-dimensional point cloud data corresponding to the target pixel A is "−0.030", an x-coordinate of the point on the three-dimensional point cloud data corresponding to a pixel B is "−0.020", an x-coordinate of the point on the three-dimensional point cloud data corresponding to a pixel C is "−0.010", an x-coordinate of the point on the three-dimensional point cloud data corresponding to a pixel D is "0", and an x-coordinate of the point on the three-dimensional point cloud data corresponding to an image E is "0.010". A y-coordinate of the point on the three-dimensional point cloud data corresponding to the target pixel A is "0.020", a y-coordinate of the point on the three-dimensional point cloud data corresponding to a pixel F is "0.040", and a y-coordinate of the point on the three-dimensional point cloud data corresponding to a pixel G is "0.060".

The specifying unit 120*c* specifies, from among the pixels included in the rectangular range 140 of the 2.5D image data 110*b*, pixels other than the target pixel A as neighbor pixels. Note that the specifying unit 120*c* excludes, from the neighbor pixels, a pixel in which a value of the depth is zero even if it is included in the rectangular range 140. The specifying unit 120*c* outputs, to the elimination unit 120*d*, information in which information (identification number) regarding the target point of the three-dimensional point cloud data 110*a* corresponding to the target pixel is associated with information (identification number) regarding the neighbor point of the three-dimensional point cloud data 110*a* corresponding to each neighbor pixel.

The specifying unit 120*c* repeatedly performs the process described above on each pixel included in the edge portion 130, thereby outputting the information regarding the target point and the information regarding the neighbor point corresponding to the target point to the elimination unit 120*d*.

The elimination unit 120*d* is a processing unit that eliminates the target point on the basis of the point group density of the target point. Hereinafter, an example of a process performed by the elimination unit 120*d* will be described. The elimination unit 120*d* obtains the information regarding the target point and the information regarding a plurality of the neighbor points corresponding to the target point, and calculates the distance between the target point and each of the neighbor points. The elimination unit 120*d* obtains the three-dimensional coordinates of the target point and each of the neighbor points from the three-dimensional point cloud data 110*a*.

The elimination unit 120*d* counts, as point group density, the number of the neighbor points at which the distance to the target point is less than the radius r. The elimination unit 120*d* does not eliminate the target point in the case where the point group density is equal to or higher than a threshold value. On the other hand, the elimination unit 120*d* eliminates the target point in the case where the point group density is less than the threshold value. For example, the elimination unit 120*d* eliminates a record of the target point to be eliminated from the three-dimensional point cloud data 110*a*.

The elimination unit 120*d* repeatedly performs the process described above on other target points to calculate the point group density, and compares the point group density with the threshold value, thereby eliminating the target point.

Figure 11:
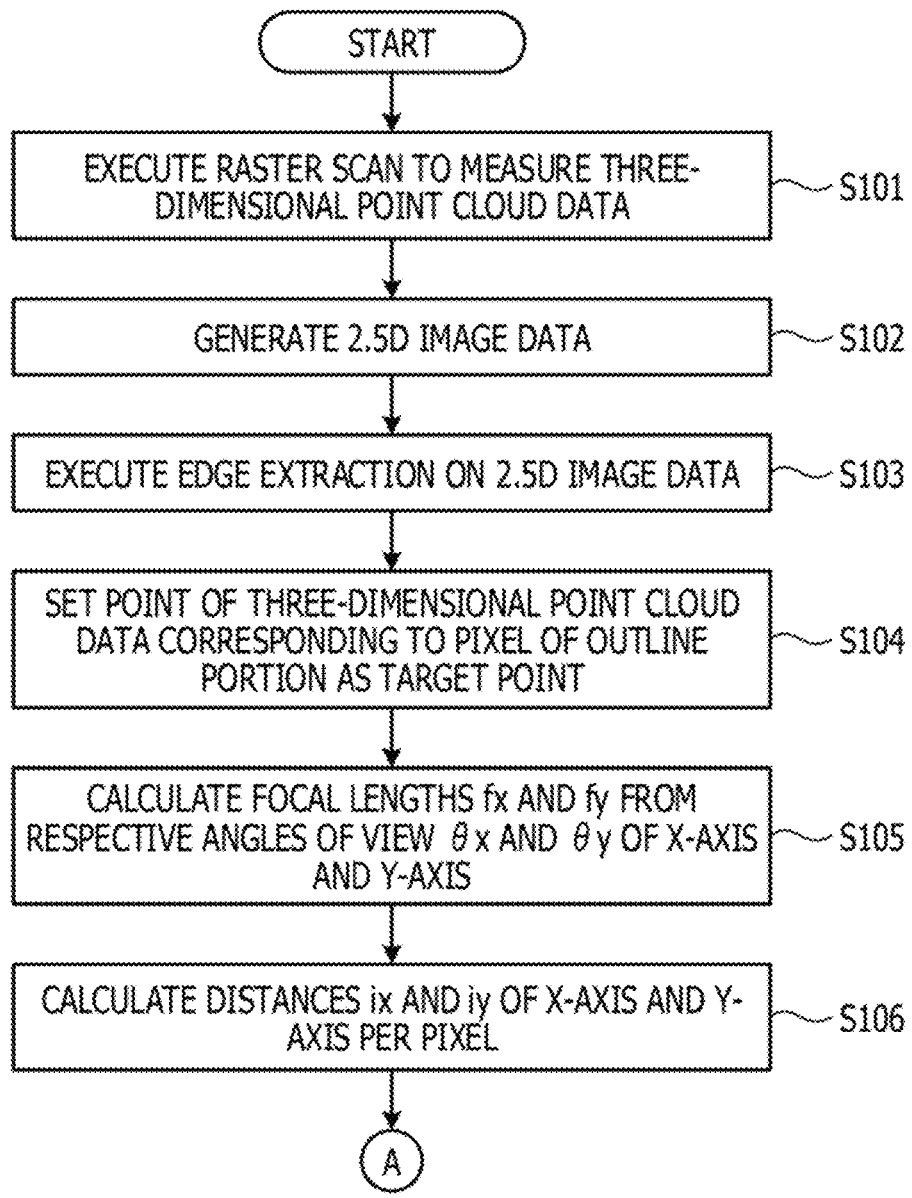
FIG. 11 is a flowchart (1) illustrating a processing procedure of the distance information processing apparatus according to the present embodiment.
Figure 12:
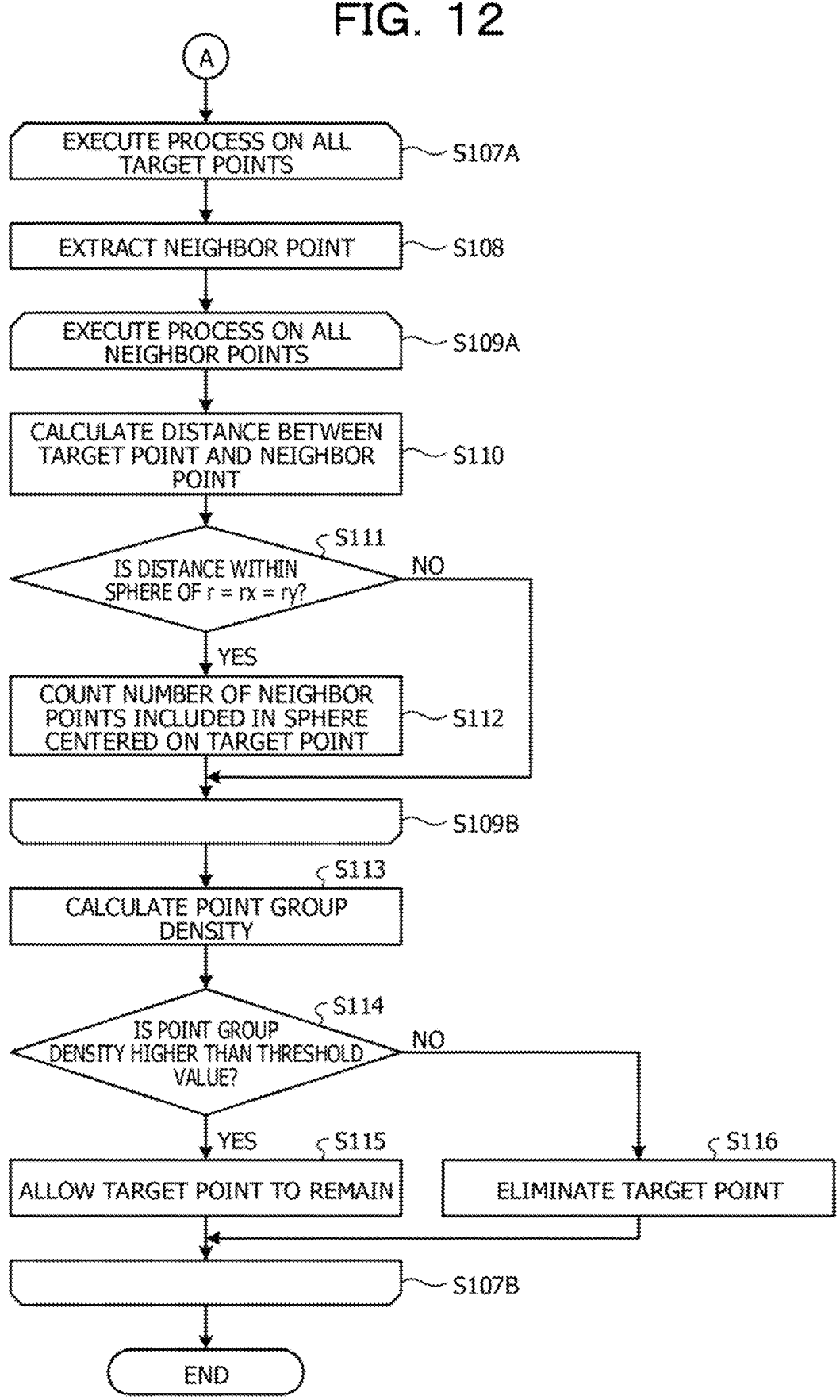
FIG. 12 is a flowchart (2) illustrating a processing procedure of the distance information processing apparatus according to the present embodiment.

Next, an exemplary processing procedure of the distance information processing apparatus 100 according to the present embodiment will be described. FIGS. 11 and 12 are flowcharts illustrating the processing procedure of the distance information processing apparatus according to the present embodiment. As illustrated in FIG. 11, the distance sensor 50 coupled to the distance information processing apparatus 100 executes a raster scan to measure the three-dimensional point cloud data 110*a* (step S101).

The generation unit 120*b* of the distance information processing apparatus 100 generates the 2.5D image data 110*b* on the basis of the three-dimensional point cloud data 110*a* (step S102). The specifying unit 120*c* of the distance information processing apparatus 100 executes the edge extraction on the 2.5D image data 110*b* (step S103). The specifying unit 120*c* sets the point of the three-dimensional point cloud data corresponding to the pixel of the edge portion as a target point (step S104).

The specifying unit 120*c* calculates the focal lengths fx and fy from the respective angles of view θx and θy of the x-axis and the y-axis (step S105). The specifying unit 120*c* calculates the distances ix and iy of the x-axis and the y-axis per pixel (step S106), and proceeds to step S107A of FIG. 12.

The specifying unit 120*c* and the elimination unit 120*d* of the distance information processing apparatus 100 repeatedly execute the process of steps S107A to S107B on all the of target points. The specifying unit 120*c* extracts the neighbor points (step S108).

The elimination unit 120*d* repeatedly executes the process of steps S109A to S109B on all of the neighbor points. The elimination unit 120*d* calculates the distance between the target point and the neighbor point (step S110). In the case where the distance is not within the sphere of r=rx=ry (No in step S111), the elimination unit 120*d* proceeds to step S109B. On the other hand, in the case where the distance is within the sphere of r=rx=ry (Yes in step S111), the elimination unit 120*d* counts the number of neighbor points included in the sphere centered on the target point (step S112), and proceeds to step S109B.

The elimination unit 120*d* calculates the point group density of the target point (step S113). In the case where the point group density is equal to or higher than the threshold value (Yes in step S114), the elimination unit 120*d* allows the target point to remain (step S115), and proceeds to step S107B. On the other hand, in the case where the point group density is lower than the threshold value (No in step S114), the elimination unit 120*d* eliminates the target point (step S116), and proceeds to step S107B.

Next, effects of the distance information processing apparatus 100 according to the present embodiment will be described. In the case of calculating the point group density of the three-dimensional point cloud data 110*a*, the distance information processing apparatus 100 narrows the target to be calculated to the target point and the neighbor point and performs the calculation, whereby the target to be calculated can be reduced.

For example, assuming that the number of points corresponding to each pixel of the 2.5D image data 110b illustrated in FIG. 9 is 114 points, the target pixel is narrowed to the ring portion 130, whereby the number of target points can be reduced from 114 points (N) to 85 points. Further, the neighbor points can be reduced from 113 points (N−1) per target point to 45 points included in the rectangular range.

Furthermore, in the case of generating the three-dimensional point cloud data 110a, the distance sensor 50 of the distance information processing apparatus 100 executes the raster scan, whereby the records of the three-dimensional point cloud data 110a are arranged in the order of execution of the raster scan. Accordingly, it becomes possible to easily specify other points existing around a certain point included in each of the three-dimensional point cloud data 110a.

Figure 13:
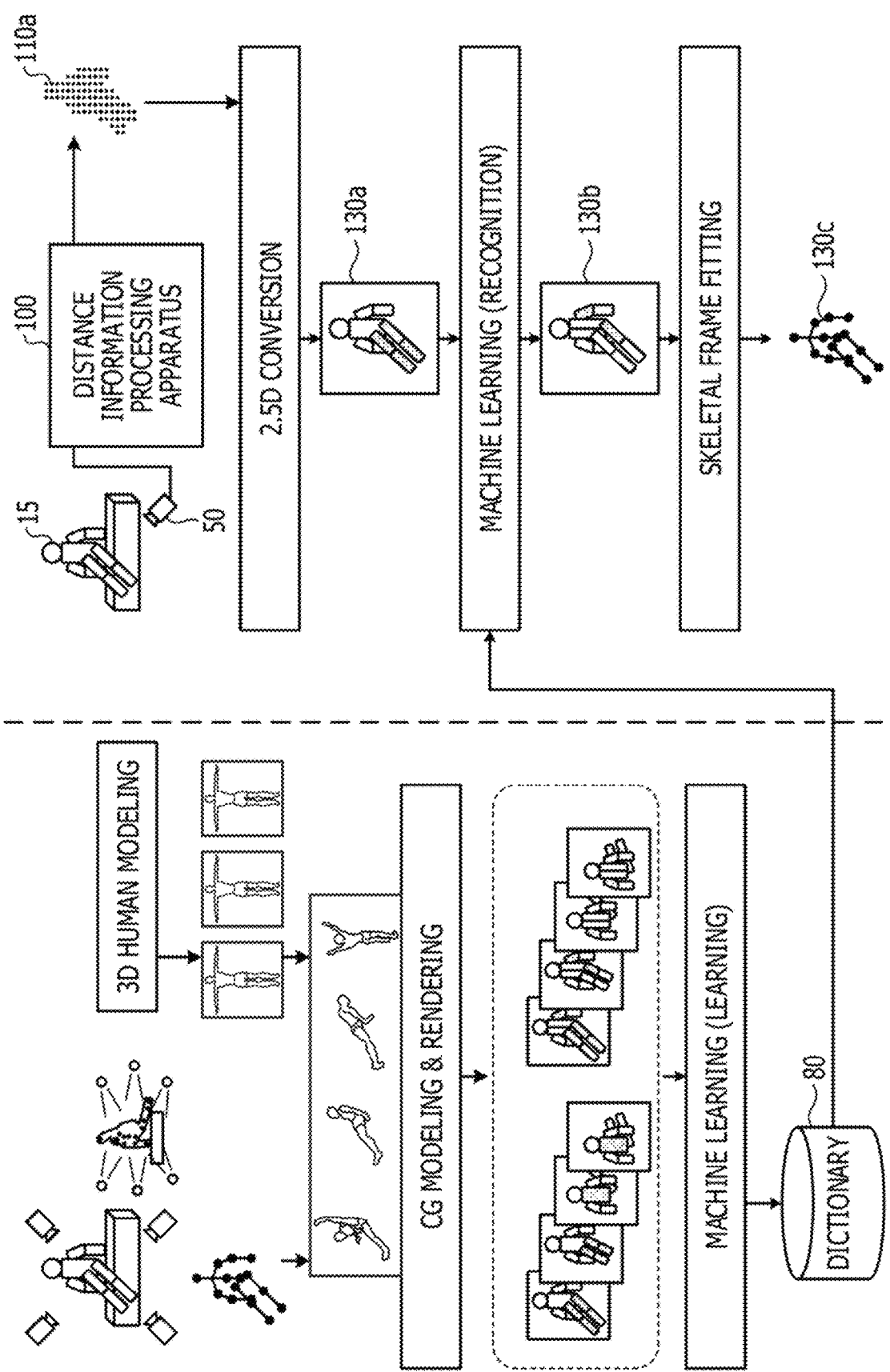
FIG. 13 is a diagram for illustrating an exemplary use of the three-dimensional point cloud data.

Next, an exemplary use of the three-dimensional point cloud data 110a from which edge noise has been removed by the distance information processing apparatus 100 according to the present embodiment will be described. FIG. 13 is a diagram for illustrating an exemplary use of the three-dimensional point cloud data. The three-dimensional point cloud data 110a is used in the case of making determination in a sport competition, and the like.

For example, as illustrated in FIG. 13, the three-dimensional point cloud data 110a from which the edge noise output from the distance information processing apparatus 100 has been removed is subject to 2.5D conversion to generate the 2.5D image data 130a. The 2.5D image data 130a is compared with a dictionary 80 obtained as a result of machine learning, and is recognized in a plurality of partial areas, thereby generating recognition data 130b. The dictionary 80 is information obtained as a result of 3D human modeling, CG modeling and rendering, and machine learning.

The recognition data 130b is subject to skeletal frame fitting, whereby a skeletal frame 130c of the three-dimensional object (player) 15 is specified. The process described above is repeatedly executed, whereby a motion of the skeletal frame 130c can be specified and, for example, a technique or the like can be identified.

Figure 14:
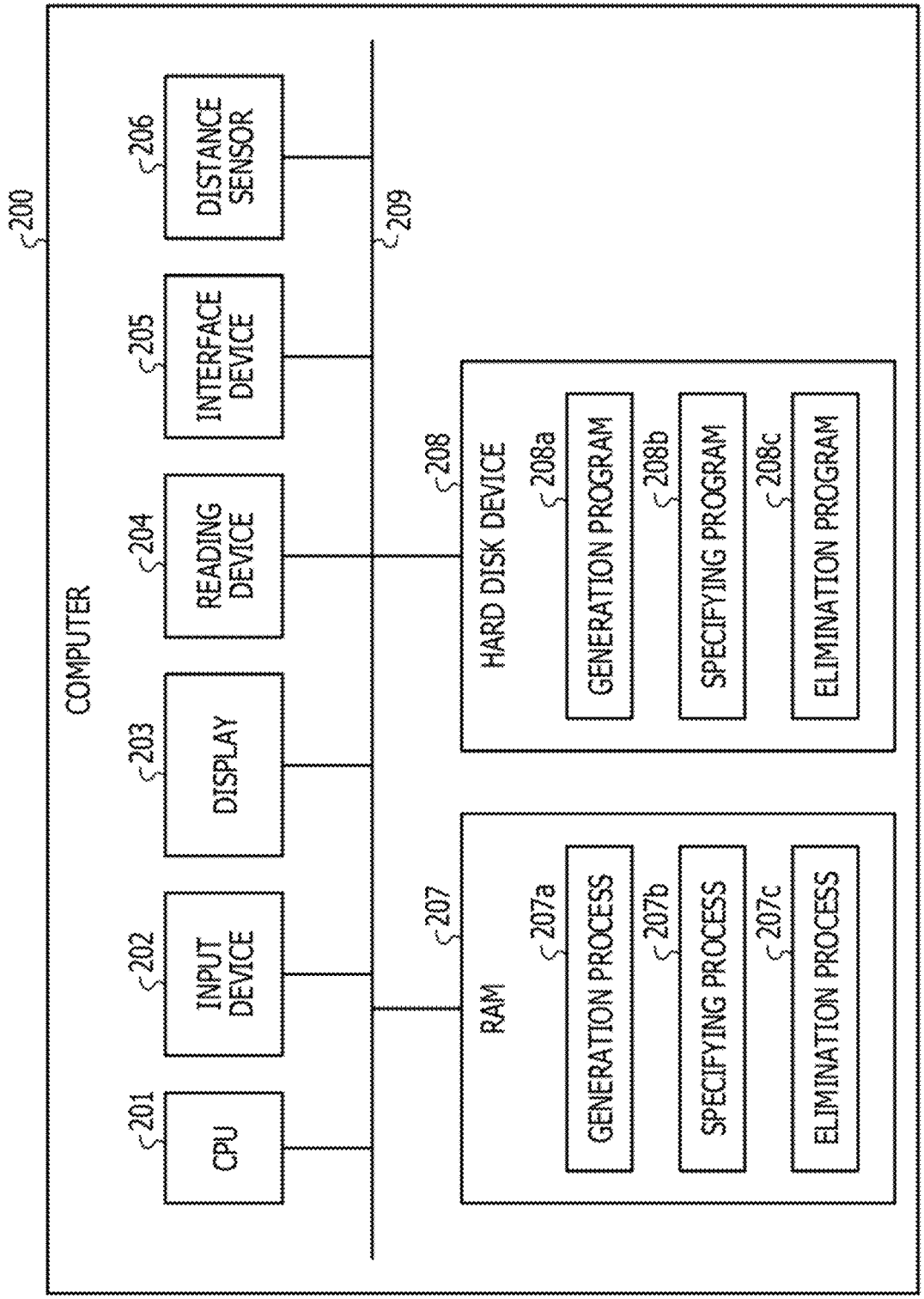
FIG. 14 is a diagram illustrating an exemplary hardware configuration of a computer that implements functions similar to those of the distance information processing apparatus.

Next, an exemplary hardware configuration of a computer that implements functions similar to those of the distance information processing apparatus 100 described in the embodiment above will be described. FIG. 14 is a diagram Illustrating an exemplary hardware configuration of the computer that implements functions similar to those of the distance information processing apparatus.

As illustrated in FIG. 14, a computer 200 includes a CPU 201 for executing various calculation processing, an input device 202 for receiving data input from a user, and a display 203. The computer 200 further includes a reading device 204 for reading programs and the like from a storage medium, and an interface device 205 for exchanging data with another computer via a network. The computer 200 includes a distance sensor 206. The computer 200 further includes a RAM 207 for temporarily storing various kinds of information, and a hard disk drive 308. Each of the devices 201 to 208 is coupled to a bus 209.

The hard disk drive 208 has a generation program 208a, a specifying program 208b, and an elimination program 208c. The CPU 201 reads the generation program 208a, the specifying program 208b, and the elimination program 208c, and loads them in the RAM 207.

The generation program 208a functions as a generation process 207a. The specifying program 208b functions as a specifying process 207b. The elimination program 208c functions as an elimination process 207c.

The processing of the generation process 207a corresponds to the processing of the generation unit 120b. The processing of the specifying process 207b corresponds to the processing of the specifying unit 120c. The processing of the elimination process 207c corresponds to the processing of the elimination unit 120d.

Note that the respective programs 208a to 208c may not necessarily be stored in the hard disk drive 208 in advance. For example, each of the programs may be stored in a "portable physical medium" such as a flexible disk (FD), a CD-ROM, a DVD disk, a magneto-optical disk, or an IC card to be inserted in the computer 200. Then, the computer 200 may read the respective programs 208a to 208c to execute them.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus, comprising:
   a memory; and
   a processor coupled to the memory and configured to:
   generate, based on three-dimensional point cloud data indicating three-dimensional coordinates of each point on a three-dimensional object, image data in which two-dimensional coordinates of each point and a depth of each point are associated with each other;
   specify, as a target point, a point of the three-dimensional point cloud data corresponding to an edge pixel included in an edge portion of the image data, and specify, as a neighbor point, a point of the three-dimensional point cloud data corresponding to a neighbor pixel of the edge pixel;
   count the neighbor point at which a distance to the target point is less than a predetermined distance; and
   eliminate the target point when a number of the counted neighbor points as a point density is less than a predetermined number.

2. The information processing apparatus according to claim 1, wherein the processor is configured to obtain the three-dimensional point cloud data from a distance sensor, wherein the distance sensor generates the three-dimensional point cloud data by executing a raster scan on the three-dimensional object and obtaining the three-dimensional coordinates of each point on the three-dimensional object in a predetermined order.

3. The information processing apparatus according to claim 2, wherein the processor is configured to: calculate a distance per pixel of the image data based on a focal length of the distance sensor; and specify, from a relationship between the distance per pixel and the predetermined distance, a range of pixels on the edge pixel corresponding to the neighbor point.

4. A method comprising:
   generating, by a computer, based on three-dimensional point cloud data indicating three-dimensional coordinates of each point on a three-dimensional object, image data in which two-dimensional coordinates of each point and a depth of each point are associated with each other;

specifying, as a target point, a point of the three-dimensional point cloud data corresponding to an edge pixel included in an edge portion of the image data;

specifying, as a neighbor point, a point of the three-dimensional point cloud data corresponding to a neighbor pixel of the edge pixel;

counting the neighbor point at which a distance to the target point is less than a predetermined distance; and eliminating the target point when a number of the counted neighbor points as a point density is less than a predetermined number.

5. The method according to claim 4, further comprising: obtaining the three-dimensional point cloud data from a distance sensor, wherein the distance sensor generates the three-dimensional point cloud data by executing a raster scan on the three-dimensional object and obtaining the three-dimensional coordinates of each point on the three-dimensional object in a predetermined order.

6. The method according to claim 5, wherein the specifying calculates a distance per pixel of the image data based on a focal length of the distance sensor, and specifies, from a relationship between the distance per pixel and the predetermined distance, a range of pixels on the edge pixel corresponding to the neighbor point.

7. A non-transitory computer-readable recording medium recording a distance information processing program causing a computer to perform:

generating, bases on three-dimensional point cloud data indicating three-dimensional coordinates of each point on a three-dimensional object, image data in which two-dimensional coordinates of each point and a depth of each point are associated with each other;

specifying, as a target point, a point of the three-dimensional point cloud data corresponding to an edge pixel included in an edge portion of the image data;

specifying, as a neighbor point, a point of the three-dimensional point cloud data corresponding to a neighbor pixel of the edge pixel;

counting the neighbor point at which a distance to the target point is less than a predetermined distance; and eliminating the target point a number of the counted neighbor points as a point density is less than a predetermined number.

8. The non-transitory computer-readable recording medium according to claim 7, further comprising: obtaining the three-dimensional point cloud data from a distance sensor, wherein the distance sensor generates the three-dimensional point cloud data by executing a raster scan on the three-dimensional object and obtaining the three-dimensional coordinates of each point on the three-dimensional object in a predetermined order.

9. The non-transitory computer-readable recording medium according to claim 8, wherein the specifying calculates a distance per pixel of the image data on based on a focal length of the distance sensor, and specifies, from a relationship between the distance per pixel and the predetermined distance, a range of pixels on the edge pixel corresponding to the neighbor point.

* * * * *